S. L. AXFORD.
COMBINED HOT WATER BOTTLE AND SYRINGE RESERVOIR.
APPLICATION FILED FEB. 25, 1909.
951,044.
Patented Mar. 1, 1910.
2 SHEETS—SHEET 1.
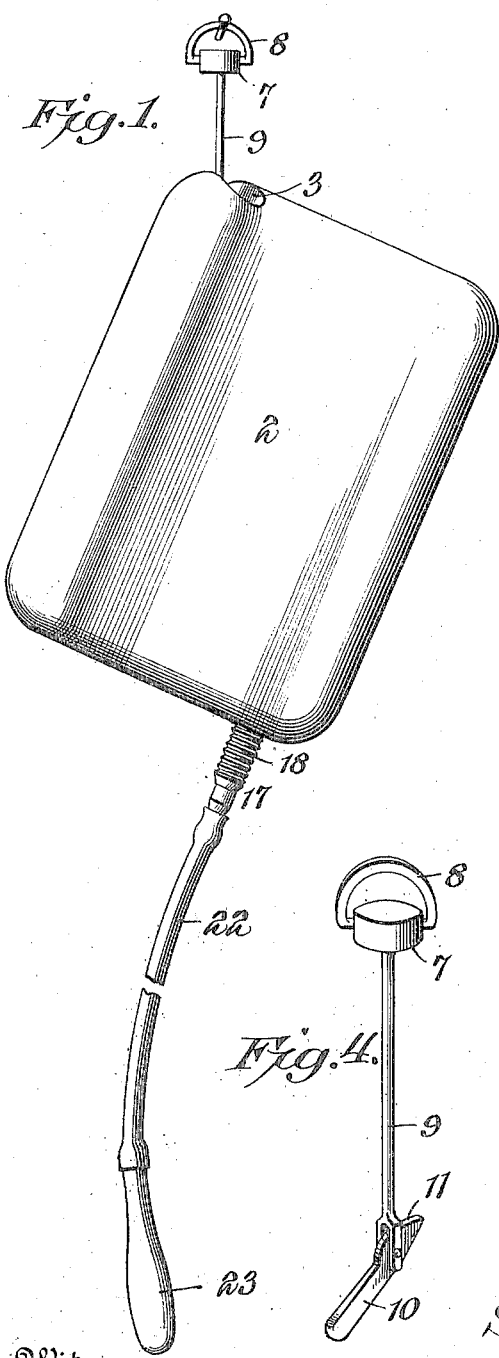
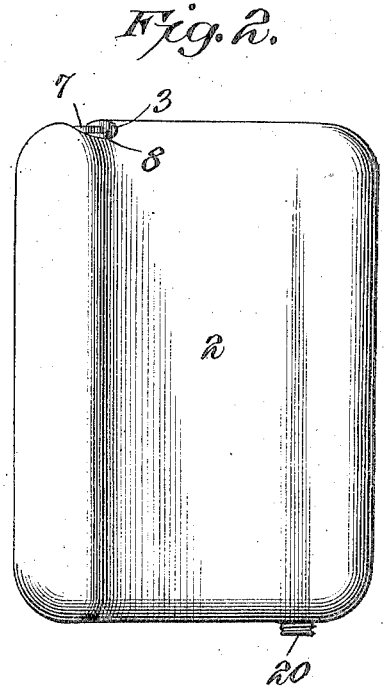
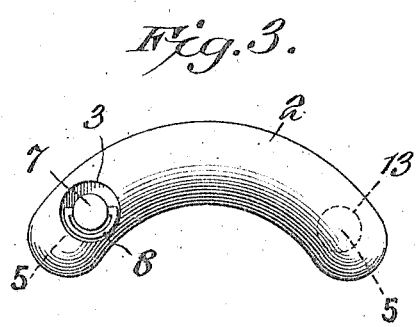
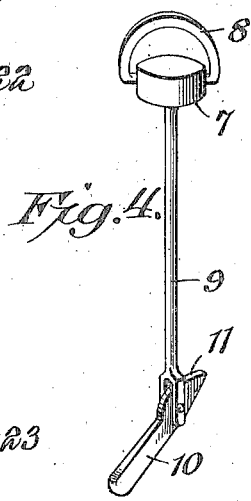
Witnesses
Howard F. Orr
Sherman L. Axford, Inventor,
By C. G. Siggers
Attorney

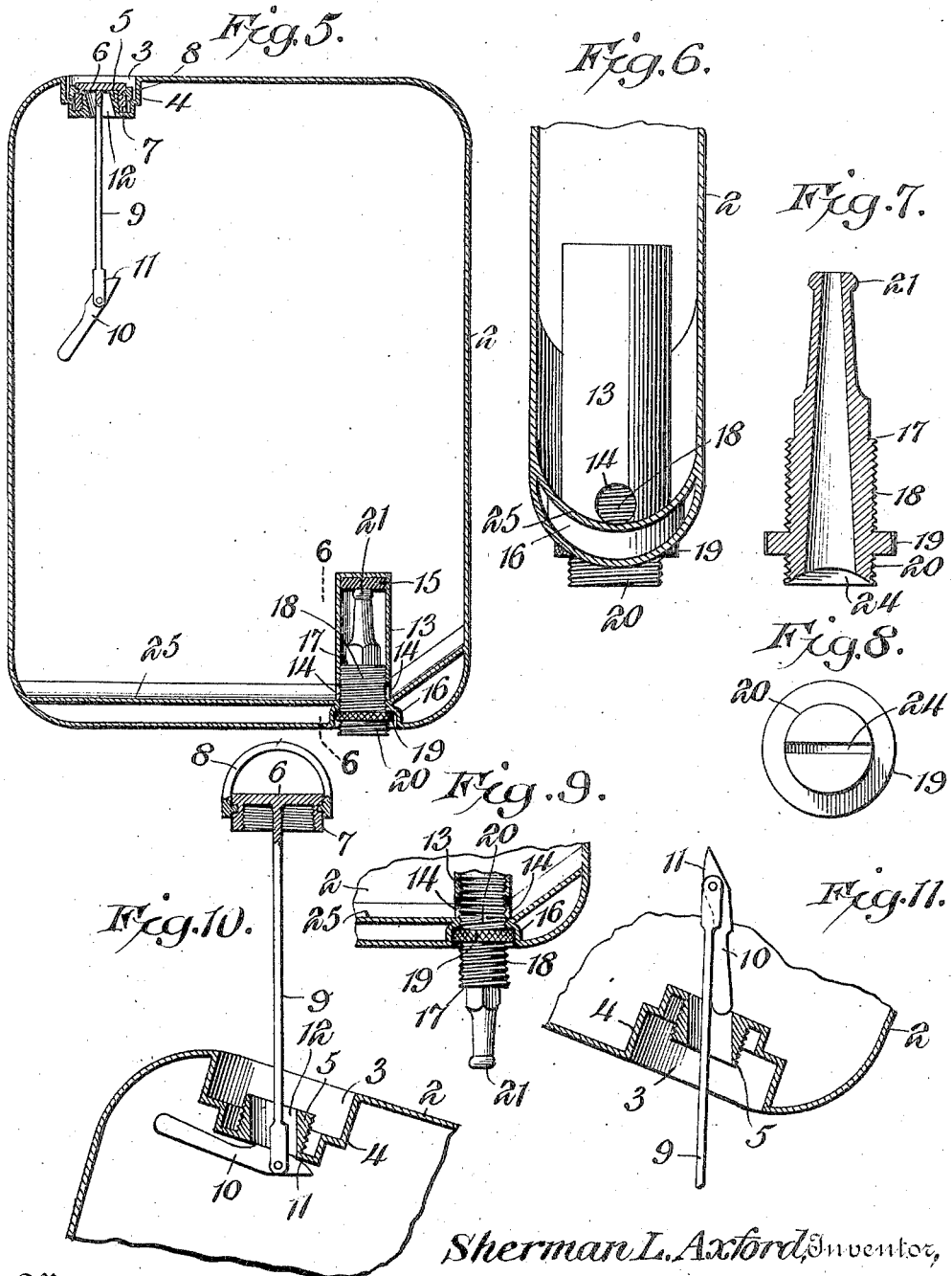

UNITED STATES PATENT OFFICE.

SHERMAN L. AXFORD, OF BURLINGTON, KANSAS.

COMBINED HOT-WATER BOTTLE AND SYRINGE-RESERVOIR.

951,044.  Specification of Letters Patent.  Patented Mar. 1, 1910.

Application filed February 25, 1909. Serial No. 479,854.

*To all whom it may concern:*

Be it known that I, SHERMAN L. AXFORD, a citizen of the United States, residing at Burlington, in the county of Coffey and State of Kansas, have invented a new and useful Combined Hot-Water Bottle and Syringe-Reservoir, of which the following is a specification.

My invention relates to that class of sanitary devices wherein a reservoir is used in conjunction with a syringe, but in which the reservoir is detachable from the syringe and usable as a hot water bottle or hot water container.

My invention contemplates an appliance of this class in which, however, the reservoir or container, as I shall call it, is of metal, curved as a whole to conform to the body of a user or to conditions of its use when used as a hot water bottle. The container is approximately rectangular in side elevation, that is, it has four side edges approximately at right-angles with each other. The container has at one corner, at its end, an inlet opening, closed by a stopper. When the stopper is opened it acts as a suspension means for the container. The diagonal lower corner of the rectangular container is provided with a nipple which, when inserted in one position closes the container, or in a reverse position forms a connection to which the flexible tube of a syringe may be attached.

The objects attained by this construction are that the container may be used as a hot water bottle or a syringe reservoir; that in the former case there are no parts projecting beyond the sheet metal of the container; that in the latter case the container is suspended from one corner so that the diagonally opposite corner is the lowest portion of the container, and that every particle of liquid is therefore emptied therefrom; and that the stopper at the uppermost corner is held away from the filling opening, thus permitting the inlet of air and preventing the formation of a vacuum. This stopper also permits the container to be filled without detaching the nozzle tube therefrom, as is necessary with the combination syringe and hot water bottle as used to-day.

In the drawings, Figure 1 is a face view of a container suspended as a reservoir for a syringe; Fig. 2 is a side elevation of the container as a hot water bottle; Fig. 3 is a top end view of Fig. 2; Fig. 4 is a detached perspective view of the stopper and its link; Fig. 5 is a transverse axial sectional view enlarged on the line 5—5 of Fig. 3; Fig. 6 is a fragmentary vertical section on an enlarged scale through the lower end of the container, the nipple socket being shown in elevation; Fig. 7 is a longitudinal axial section of the reversible nipple; Fig. 8 is a lower end view of the nipple shown in Fig. 7; Fig. 9 is a fragmentary section of the lower corner of the container showing the nipple reversed from the position shown in Fig. 5; Fig. 10 is a fragmentary section of the upper corner of the container showing the stopper seat, the stopper itself being opened as in Fig. 1; Fig. 11 is a like fragmentary sectional view with the container inverted to show the manner of removing the stopper link.

In the drawings, 2 denotes a container made of metal or other suitable material. This metallic vessel is curved laterally as shown in Fig. 2, so as to approximately conform to the body of a person. The upper and lower ends and the side edges are all rounded so that there shall be no square corners to interfere with the use of the container as a hot water bottle. One end, adjacent to one side edge, is provided with a filling opening, 3. This opening is surrounded by an inwardly and centrally extending annular flange or inset tubular stopper-receiving socket 4, having the central outwardly projecting tubular nipple 5. This construction provides a depending seat for the stopper 6, this stopper having an annular depending flange 7, screw-threaded on its interior for engagement with the nipple 5. The stopper is provided with a pivoted bail 8, whereby it may be engaged with a nail or other supporting member. The depth of the seat formed by the annular flange 4 is sufficient to entirely receive the stopper 6, as shown in Fig. 5, the bail at this time being downwardly turned and entirely housed within the socket formed by said seat. Extending from the under side of the stopper is a link 9 having at its lower end a pivoted latch 10, one arm of which is longer than the other. The upper face of the latch adjacent to the pivotal point is rounded as at 11 and the latch is so balanced on the end of the link 9 that when the stopper is inserted in place, as in Fig. 5, the latch will not drop into alinement with the link but into a position at an angle thereto so that when the stopper is withdrawn and the link drawn up with it, the rounded face 11 of the latch 10 will contact with the lower edges of the opening 12, and the latch will be turned to the position shown in Fig. 10, preventing the further withdrawal of the link and acting to support the container from the link.

As is seen in Figs. 10 and 11, the opening 12 through the nipple 5 is not concentric to the walls of the nipple, but at an angle thereto. This, when the container is used as a reservoir and supported as in Fig. 1, provides for a straight draft upon the link 9, as shown in Fig. 10.

The corner of the container directly opposite to the filling opening 3, or at least that end of the container which is adjacent to this corner, is provided with an inset tubular nipple-receiving socket 13, which extends into the edge of the container and is formed with the two perforations 14 in its side walls. The interior of the socket below these perforations is screw-threaded and the end of the socket is provided with a packing of rubber, 15. As seen from Fig. 5, the outer end of the socket, just before it joins with the exterior wall of the container is enlarged as at 16. 17 denotes a nipple shown enlarged in Fig. 7. This is made of rubber, metal or any other suitable material, is tapered from one end to the other, and has a screw-threaded shank portion, 18, extending from its middle nearly to the larger end thereof. A knurled head 19 projects from the nipple at this point and beyond this knurled head the nipple is again screw-threaded as at 20. The smaller end of the nipple is smooth surfaced and provided with an annular enlargement 21, whereby a tube 22 of rubber or other flexible material leading to a nozzle 23 may be slipped over the end of the nipple in a manner common to all appliances of this kind.

When it is desired to use the container as a reservoir for a syringe, the nipple is inserted with its large end extending into the screw-threaded portion 14 of the socket 13 in the manner shown in Fig. 1, while when it is desired to use the container as a hot water bottle the nipple is reversed and is screwed into the socket in the manner shown in Fig. 5, the imperforate wall of the nipple closing the openings 14, the knurled head 19 closing against the wall of the enlarged portion 16, and the extremity of the nipple contacting with the rubber packing, 15. As will be seen this entirely closes the container at this end, and, of course, in this use of the container, the stopper 6 is screwed home as in Fig. 5. When in the position shown in Fig. 5, the nipple 17 is practically contained within the socket 13, and does not project to any extent beyond the same. In order to facilitate the unscrewing of the nipple from this position, the large end of the nipple is provided with the arcuate slot 24. While a straight slot might be used for this purpose, which would accommodate the end of a screw driver or like device, I prefer to use an arcuate slot for the reason that thereby a coin may be used to unscrew the nipple from engagement with the socket 13. When the nipple is reversed from the position shown in Fig. 5, into that shown in Figs. 1 and 9, it will be seen that the openings 14 in the socket are unobstructed, and, hence, that liquid will flow through said openings down through the central bore of the nipple and so through the nipple 22 and the connected nozzle. The openings 14 being located some little distance above the inside face of the end of the container, a certain amount of liquid would never pass from the container when the same is used as a syringe reservoir. I therefore provide the false bottom 25, which extends transversely between the container walls as shown in Fig. 6, the upper surface of the false bottom being in line with the holes 14. Instead of using a separate sheet of metal to form this false bottom, it is obvious that I might make the bottom solid and attain the same end without in anyway departing from the principle of the invention.

It will be seen that my invention provides a container which as a hot water bottle, presents a smooth, rounded and pleasant surface without any angles to render it disagreeable to the touch. The removable stopper, which also acts as a suspending means, provides for a sufficient inlet of air so that the liquid within the container will pass quickly down through the tube and nozzle. The peculiar form of the container provides for its being suspended at one corner and for the diagonally opposite corner therefor being the very lowest point of the container. The end walls therefore act as a hopper, directing all water down through the nipple and tube.

When the device is used as a hot water bottle there are no projecting parts. Both the stopper and the nipple are entirely inclosed. The stopper may be readily detached in the manner shown in Fig. 11 for filling, but when reinserted acts as an effective support for the container itself.

Having thus described my invention, what I claim as new and desire to secure by Letters-Patent, is:

1. The combination of a container having an opening, an inset socket at the opening, and a stopper arranged in the said socket for closing the said opening and disposed inwardly from the outer surface of the container, with a stopper retainer consisting of a rod rigidly secured to the stopper and extending into the container, and a member pivoted on the inner end of the rod and weighted to prevent the rod from being fully withdrawn from the container when the latter is in upright position and to shift its position when the container is inverted for permitting the rod to be removed.

2. A combined syringe reservoir and hot water bottle, comprising a relatively flattened rectangular container, said container having at one corner an opening adapted for the attachment of a nozzle tube, and at the diagonally opposite corner being provided with an opening, and a single device whereby the last-mentioned opening may be closed and the container supported.

3. A combined syringe reservoir and hot water bottle comprising a substantially rectangular flattened casing having at one corner a reversible nipple removably connected with the casing in outstanding position for the attachment of a nozzle tube and set into the casing when not in use, the diagonally opposite corner of the casing being provided with an opening, and a stopper adapted to close the opening.

4. A combined syringe reservoir and hot water bottle comprising a substantially rectangular flattened casing, said casing having at one corner a means for the attachment of a nozzle tube, the diagonally opposite corner of the casing being provided with an opening, and a stopper adapted to close the opening, said stopper having means whereby the casing may be supported with the stopper in spaced relation to the casing so that the opening shall be unobstructed.

5. A combined syringe reservoir and hot water bottle comprising a substantially rectangular container having at one corner a means for the attachment of a nozzle tube, the diagonally opposite corner of the container being provided with an opening, and a stopper adapted in one position to close the opening, said stopper having a linked connection with the interior walls of the container constructed to permit the stopper to be removed and form a container supporting means and yet have supporting engagement with the container permitting the ingress of air to the container.

6. A combined syringe and hot water bottle comprising a container having at one end a means for the attachment of a nozzle tube, the opposite end of the container being provided with an inlet opening, and a stopper adapted to close the opening, said stopper having a link extending into the container at its end formed with means for engaging the container, the stopper so constructed when withdrawn from the opening, forming the suspension means for the container and having engagement through its link with the container.

7. A combined syringe reservoir and hot water bottle including a container having at one end a means for the attachment of a nozzle tube, the opposite end of the container being provided with an inlet opening, and a stopper adapted in one position to close the opening, said stopper having a link extending downward through the opening and into the interior of the container, said link being smaller than the opening and provided at its end with an enlarged portion of greater extent in one direction than the opening.

8. A combined syringe reservoir and hot water bottle comprising a container having at one end a means for the attachment of a nozzle tube and at the opposite end an inlet opening having screw-threaded walls, and a stopper for closing said opening having screw-threaded flanges to engage with said walls and being provided with a depending link of less section than the inlet opening extending through said opening and being formed at its end with a pivoted latch longer than the diameter of the opening and adapted to engage with the walls of the opening when the stopper is removed, said stopper thereby forming a means for suspending the container.

9. A combined syringe reservoir and hot water bottle comprising a container having at one corner a means for the attachment of a nozzle tube, the other end of said container being formed with an inlet opening having screw-threaded walls, a stopper having screw-threaded walls to engage with the walls of the opening, the stopper being provided with a ring whereby it may be engaged with the suspending means and with a depending link smaller in section than the area of the inlet opening, the end of said link being provided with a pivoted latch adapted to engage against the walls of the opening when the stopper is removed from its screw-threaded engagement.

10. A combined syringe reservoir and hot water bottle comprising a substantially rectangular flattened container having at one corner a means for the attachment of a nozzle tube, the diagonally opposite corner of the casing being provided with an inwardly recessed seat formed with a central opening into the interior of the container, and a stopper adapted to be received within the recessed seat having a suspending ring attached to it and a depending link extending into the container and having a pivoted cross bar on its end adapted, when the stopper is disengaged from the seat and drawn out to its full extent, to engage with the walls of the opening and permit the container to be supported by the stopper.

11. A combined hot water bottle and syringe reservoir comprising a container having at one end a seat depressed below the general level of the material of the container and having an inlet opening, and at the other end a socket extending inward into the container and formed with an outlet opening, a stopper adapted to close the inlet opening and to be entirely received within the depressed seat, and a nipple constructed for the attachment of a nozzle tube but adapted to be received entirely within said socket and to close the outlet opening therethrough when so received.

12. The combination of a container having an outlet opening, a reversible nipple, means for securing the nipple to the container in inset position for normally closing the opening, means for connecting the nipple to the container in outstanding position, and a detachable tube connected with the nipple when in outstanding position.

13. The combination of a container having an opening, a nipple reversibly mounted in the opening and arranged to be secured in inset or outstanding position, a tube detachably connected with the nipple when in outstanding position, a tubular member arranged within the container at the opening thereof for housing the nipple, and a packing contained in the tubular member for closing the nipple when in inset position.

14. The combination of a container having an opening, an inset fixed tube at the opening closed at its inner end and provided with a port at its side, a nipple normally housed in the tube for closing the port thereof, means for reversibly mounting the nipple in the tube and supporting the nipple in outstanding position, and means on the nipple for detachable connection with the tube.

15. A combined syringe and hot water bottle having at one end an interiorly extending socket, the wall of said socket near its junction with the container wall being formed with outlet openings and the interior of the outer end of the socket being screw-threaded, in combination with a nipple having an enlarged screw-threaded body and a reduced end formed with a terminal head adapted to be engaged with a nozzle tube, said nipple when inserted in one position into the socket having its tube-engaging end adjacent to the inner end of the socket and its screw-threaded body closing the outlet openings through the socket, but adapted to be inserted with its other end into said socket, thereby leaving the outlet openings unobstructed and forming a conducting means for the liquid from the container into the nozzle tube.

16. The combination with a liquid container having at one end an inwardly extending socket formed with an interiorly screw-threaded wall, said wall having outlet openings, of a nipple having a screw-threaded body, and a reduced end adapted for engagement with the tube of a nozzle, said screw-threaded body of the nipple being formed with an outwardly projecting annular stop, the nipple being adapted to be entirely contained within the socket, in one position and to close the openings through the socket and in the other position to be engaged with the outer end of the socket below the outlet openings and to form a conducting means from the container to the nozzle tube.

17. A combined syringe and hot water bottle having at one end an interiorly extending socket formed with outlet openings, in combination with a tube-engaging nipple adapted to be entirely inserted within the socket and in this position to close the outlet openings, said nipple being provided at one end with an arcuate slot whereby it may be disengaged from the socket.

18. A combined syringe reservoir and hot water bottle comprising a container having at one end an inwardly extending socket, the interior of the socket being enlarged at its junction with the walls of the container and being formed with outlet openings just beyond this enlargement, in combination with a nozzle-tube engaging nipple adapted to be entirely contained within said socket and in this position to close said outlet openings, said nipple being formed with an annularly projecting stop received within said enlarged portion of the socket.

19. A combined syringe reservoir and hot water bottle comprising a container having at one end an inwardly extending socket, the interior of the socket being enlarged at its junction with the wall of the container and being formed with outlet openings just beyond this enlargement, said container being formed with an inner bottom coincident with and leading to the said outlet openings, in combination with a nozzle-tube engaging nipple adapted to be entirely contained within said socket and in this position to close said outlet openings, said nipple being formed with an annularly projecting stop received within said enlarged portion of the socket.

20. A combined syringe reservoir and hot water bottle comprising a rectangular container having at one corner an inlet opening and at the other corner an inwardly extending socket having outlet openings in its wall, in combination with a stopper for closing the inlet openings of the container, having means whereby it may be engaged with a support and having a link extending into the container provided with a cross bar adapted to engage with the walls of the inlet opening, and a nipple adapted to be received entirely within said socket and in this position to close the outlet openings thereof, but being insertible into the lower end of the socket but projected therefrom to form a means of attachment of a nozzle tube and in this position to leave the outlet openings unobstructed.

21. A combined syringe reservoir and hot water bottle comprising a substantially rectangular container having at one end an inlet opening provided with depressed walls forming a recessed seat and at the other end with an inwardly extending socket having an outlet opening, in combination with a stopper adapted to engage with the walls of the inlet opening to close the same and in this position to be entirely received within the recessed seat, said portion having a link extending into the container and provided with a cross bar, and a nipple adapted in one position to be received entirely within the socket and to close the outlet opening therethrough and in the other position to engage with and project from the socket, leaving the outlet openings unobstructed and providing means for the attachment of a nozzle tube.

22. The combination of a container having an opening, an inset fixed tube at the opening closed at its inner end and provided with a port at its side, a nipple normally housed in the tube for closing the port thereof, means for reversibly mounting the nipple in the tube and supporting the nipple in outstanding position, means on the nipple for detachable connection with the tube, and means within the said tube for sealing the inner end of the nipple when the latter is housed in the former.

23. The combination of a container having separate openings, inset tubular sockets at the openings, a single device forming a stopper for one socket and a suspending means for the container, and a single device serving as a stopper for the other socket when the device is in one position and as a nipple when the device is in another position.

24. A container having separate openings, a single device for closing one of the openings when the container is used as a water bottle and as a detachable suspending means when the container is used as a syringe reservoir, and a combined stopper and nipple removably and reversibly mounted in the other opening.

25. A container having an opening, a stopper for the opening, a device forming a retainer for the stopper when the latter is disconnected and also serving as a suspension means, and means for detachably connecting the device with the container, said means and device being disposed within the container when the stopper is in closed position and said means being arranged to assume a position to permit the device to be removed from the container when the latter is inverted.

26. A combined stopper, reservoir-suspending means and stopper retainer consisting of a stopper, a bail connected with the stopper, a rod connected with the stopper, and a latch pivotally connected with the rod at the end opposite from the stopper and arranged to assume a position parallel with the rod when the stopper is lowermost.

In testimony, that I claim the foregoing as my own, I have hereto affixed my signature in the presence of two witnesses.

SHERMAN L. AXFORD.

Witnesses:
M. M. PILCHER,
T. W. GILGES.